United States Patent
Yoo et al.

(10) Patent No.: US 11,647,200 B2
(45) Date of Patent: *May 9, 2023

(54) METHOD AND APPARATUS FOR DECODING IMAGE BY USING TRANSFORM ACCORDING TO BLOCK SIZE IN IMAGE CODING SYSTEM

(71) Applicant: LG ELECTRONICS INC., Seoul (KR)

(72) Inventors: Sunmi Yoo, Seoul (KR); Jangwon Choi, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,113

(22) Filed: Oct. 29, 2021

(65) Prior Publication Data

US 2022/0053193 A1    Feb. 17, 2022

Related U.S. Application Data

(63) Continuation of application No. 16/853,484, filed on Apr. 20, 2020, now Pat. No. 11,206,403, which is a
(Continued)

(51) Int. Cl.
*H04N 19/132* (2014.01)
*H04N 19/122* (2014.01)
(Continued)

(52) U.S. Cl.
CPC ......... *H04N 19/132* (2014.11); *H04N 19/122* (2014.11); *H04N 19/176* (2014.11); *H04N 19/61* (2014.11)

(58) Field of Classification Search
CPC .. H04N 19/122; H04N 19/132; H04N 19/176; H04N 19/61; H04N 19/70
See application file for complete search history.

(56) References Cited

U.S. PATENT DOCUMENTS 10,341,661 B2 *  7/2019  Kim ................. H04N 19/176
11,206,403 B2 * 12/2021  Yoo ................. H04N 19/176
(Continued)

FOREIGN PATENT DOCUMENTS

CN    103181168 A    6/2013
CN    104521232 A    4/2015
(Continued)

OTHER PUBLICATIONS

XP055263413: Sze et al., "High Efficiency Video Coding (HEVC): Algorithms and Architectures—Chapter 8: Entropy Coding in HEVC," In: High Efficiency Video Coding (HEVC), Jan. 1, 2014, Springer International Publishing, Cham, pp. 209-269 (67 Pages).
(Continued)

*Primary Examiner* — Farzana Hossain
(74) *Attorney, Agent, or Firm* — Dentons US LLP

(57) ABSTRACT

A method for decoding an image by a decoding apparatus according to the present invention comprises the steps of: deriving predicted samples by performing prediction on a current block; determining whether the current block is to be divided, on the basis of a size and a maximum transform size of the current block; when the current block is determined to be divided, dividing the current block into transform blocks; deriving transform coefficients of the transform blocks; deriving residual samples by performing an inverse transform procedure for the transform coefficients; and generating a reconstructed picture on the basis of the residual samples and the predicted samples, wherein, when the size of the current block is larger than the maximum transform size, the current block is determined to be divided.

13 Claims, 10 Drawing Sheets

Related U.S. Application Data continuation of application No. PCT/KR2019/005206, filed on Apr. 30, 2019.

(60) Provisional application No. 62/666,100, filed on May 3, 2018.

(51) Int. Cl.
*H04N 19/176* (2014.01)
*H04N 19/61* (2014.01)

(56) References Cited

U.S. PATENT DOCUMENTS

| | | | | |
|---|---|---|---|---|
| 2014/0010450 A1* | 1/2014 | Suwa | | G06V 40/171 |
| | | | | 382/173 |
| 2014/0072215 A1* | 3/2014 | Terada | | H04N 19/96 |
| | | | | 382/166 |
| 2014/0079332 A1* | 3/2014 | Zheng | | H04N 19/119 |
| | | | | 382/248 |
| 2014/0097322 A1* | 4/2014 | Kappich | | B60K 5/1216 |
| | | | | 248/634 |
| 2014/0254674 A1 | 9/2014 | Lee | | H04N 19/176 |
| | | | | 375/240.12 |
| 2014/0341281 A1* | 11/2014 | Bossen | | H04N 19/11 |
| | | | | 375/240.12 |
| 2017/0230689 A1 | 1/2017 | Maw et al. | | |
| 2018/0098063 A1* | 4/2018 | Chen | | H04N 19/176 |
| 2018/0343450 A1* | 11/2018 | Zhu | | H04N 19/159 |
| 2019/0037245 A1* | 1/2019 | Kirchhoffer | | H04N 19/53 |
| 2019/0158846 A1* | 5/2019 | Moon | | H04N 19/11 |
| 2019/0222837 A1* | 7/2019 | Lee | | H04N 19/117 |
| 2019/0281297 A1* | 9/2019 | Lee | | H04N 19/597 |
| 2020/0304815 A1 | 9/2020 | Zhao et al. | | |

FOREIGN PATENT DOCUMENTS

| | | |
|---|---|---|
| JP | 2013542668 A | 11/2013 |
| KR | 10-2015-0024398 A | 3/2015 |
| KR | 10-2017-0117223 A | 10/2017 |
| KR | 10-2018-0018639 A | 2/2018 |
| KR | 10-2018-0019510 A | 2/2018 |
| WO | 12/096184 A1 | 7/2012 |
| WO | 2017/157249 A1 | 9/2017 |

OTHER PUBLICATIONS

Kim et al., "Coherent transform split pattern for non square transform units", No. JCTVC-I0149, 9. JCT-VC Meeting; Apr. 27, 2012-May 7, 2012; Geneva; (Joint Collaborative Team on Video Coding of ISO/IEC JTC1/SC29/WG11 and ITU-T SG.16), retrieved from URL: http://phenix.int-evry.fr/jct/doc_end_user/documents/9_Geneva/wg11/JCTVC-I0149-v4.zip JCTVC-I0149_r1.doc, 3 pages (Apr. 30, 2012).

Sullivan et al., "Overview of the High Efficiency Video Coding (HEVC) Standard", IEEE Transactions on Circuits and Systems for Video Technology, vol. 22, No. 12, d, pp. 1649-166 (Dec. 12, 2012).

J. Long, "Research on Key Techniques of Image Thresholding", Jun. 2014.

* cited by examiner block_split_flag = 0
cbf = 1

----- : partitioned for transform

⎯⎯ : de-blocking filter applied to transform boundary block_split_flag = 1
bt_split_flag = 1
hor_split = 0
//for block0
    cbf = 1
//for block1
    cbf = 0

——— : block partitioned based on syntax element
----- : partitioned for transform
         : de-blocking filter applied to transform boundary

METHOD AND APPARATUS FOR DECODING IMAGE BY USING TRANSFORM ACCORDING TO BLOCK SIZE IN IMAGE CODING SYSTEM

CROSS-REFERENCE TO RELATED APPLICATIONS

This application is a continuation of U.S. application Ser. No. 16/853,484, filed on Apr. 20, 2020, which is a continuation of International Application PCT/KR2019/005206, with an international filing date of Apr. 30, 2019, which claims the benefit of U.S. Provisional Application No. 62/666,100 filed on May 3, 2018, the contents of which are all hereby incorporated by reference herein in their entirety.

BACKGROUND OF THE DISCLOSURE

Field of the Disclosure

The present disclosure relates to an image coding technique, and more particularly, to an image decoding method and apparatus therefor using transform based on a block size in in an image coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present disclosure provides a method and apparatus for improving image coding efficiency.

The present disclosure also provides a method and apparatus for partitioning a block based on a size of block and a size of transform kernel and performing transform in a unit of the partitioned block.

The present disclosure also provides a method and apparatus for partitioning a block based on a size of block and a size of transform kernel and performing deblocking filtering according to the partitioned block structure.

According to an embodiment of the present disclosure, it is provided an image decoding method performed by a decoding apparatus. The method includes deriving prediction samples by performing a prediction for a current block, determining whether the current block is partitioned based on a size of the current block and a maximum transform size, partitioning the current block into transform blocks based on whether the current block is partitioned, deriving transform coefficients for the transform blocks, deriving residual samples by performing an inverse transform process for the transform coefficients, and generating a reconstructed picture based on the residual samples and the prediction samples, wherein when the size of the current block is larger than the maximum transform size, it is determined that the current block is partitioned.

According to another embodiment of the present disclosure, it is provided a decoding apparatus performing an image decoding. The decoding apparatus includes a predictor for deriving prediction samples by performing a prediction for a current block, an inverse transformer for determining whether the current block is partitioned based on a size of the current block and a maximum transform size, partitioning the current block into transform blocks based on whether the current block is partitioned, deriving transform coefficients for the transform blocks, deriving residual samples by performing an inverse transform process for the transform coefficients, and an adder for generating a reconstructed picture based on the residual samples and the prediction samples, wherein when the size of the current block is larger than the maximum transform size, it is determined that the current block is partitioned.

According to still another embodiment of the present disclosure, it is provided a video encoding method performed by an encoding apparatus. The method includes deriving prediction samples by performing a prediction for a current block, deriving residual samples based on the prediction samples and the original samples for the current block, determining whether the current block is partitioned based on a size of the current block and the maximum transform size, when it is determined that the current block is partitioned, partitioning the current block into the transform blocks, deriving transform coefficients by performing transform procedure for the residual samples included in each of the transform blocks, and deriving quantized transform coefficients by performing quantization process for the transform coefficients, wherein when the size of the current block is larger than the maximum transform size, it is determined that the current block is partitioned.

According to still another embodiment of the present disclosure, it is provided a video encoding apparatus. The encoding apparatus includes a predictor for deriving prediction samples by performing a prediction for a current block, a subtractor for deriving residual samples based on the prediction samples and the original samples for the current block, a transformer for determining whether the current block is partitioned based on a size of the current block and the maximum transform size, when it is determined that the current block is partitioned, partitioning the current block into the transform blocks, deriving transform coefficients by performing transform procedure for the residual samples included in each of the transform blocks, a quantizer for deriving quantized transform coefficients by performing quantization process for the transform coefficients, and an entropy encoder for encoding the image information including the information for the quantized transform coefficients, wherein when the size of the current block is larger than the maximum transform size, it is determined that the current block is partitioned.

According to the present disclosure, in the case that at least one side of a current block is greater than a maximum transform size, without any separate partitioning information, the partitioning of the current block may be partitioned into a transform block of a size of which partitioning becomes minimized, and through this, a bit number for partitioning information may be reduced, and computation complexity in a decoding apparatus may be reduced, and accordingly, overall coding rate may be improved.

According to the present disclosure, in the case that at least one side of a current block is greater than a maximum transform size, without any separate partitioning information, the partitioning of the current block may be partitioned into a transform block of a size of which partitioning becomes minimized, and deblocking filtering may be performed at a boundary of the partitioned transform block, and through this, a bit number for partitioning information may be reduced, and accordingly, subjective/objective image quality of an image may be improved.

DESCRIPTION OF EXEMPLARY EMBODIMENTS

Figure 1:
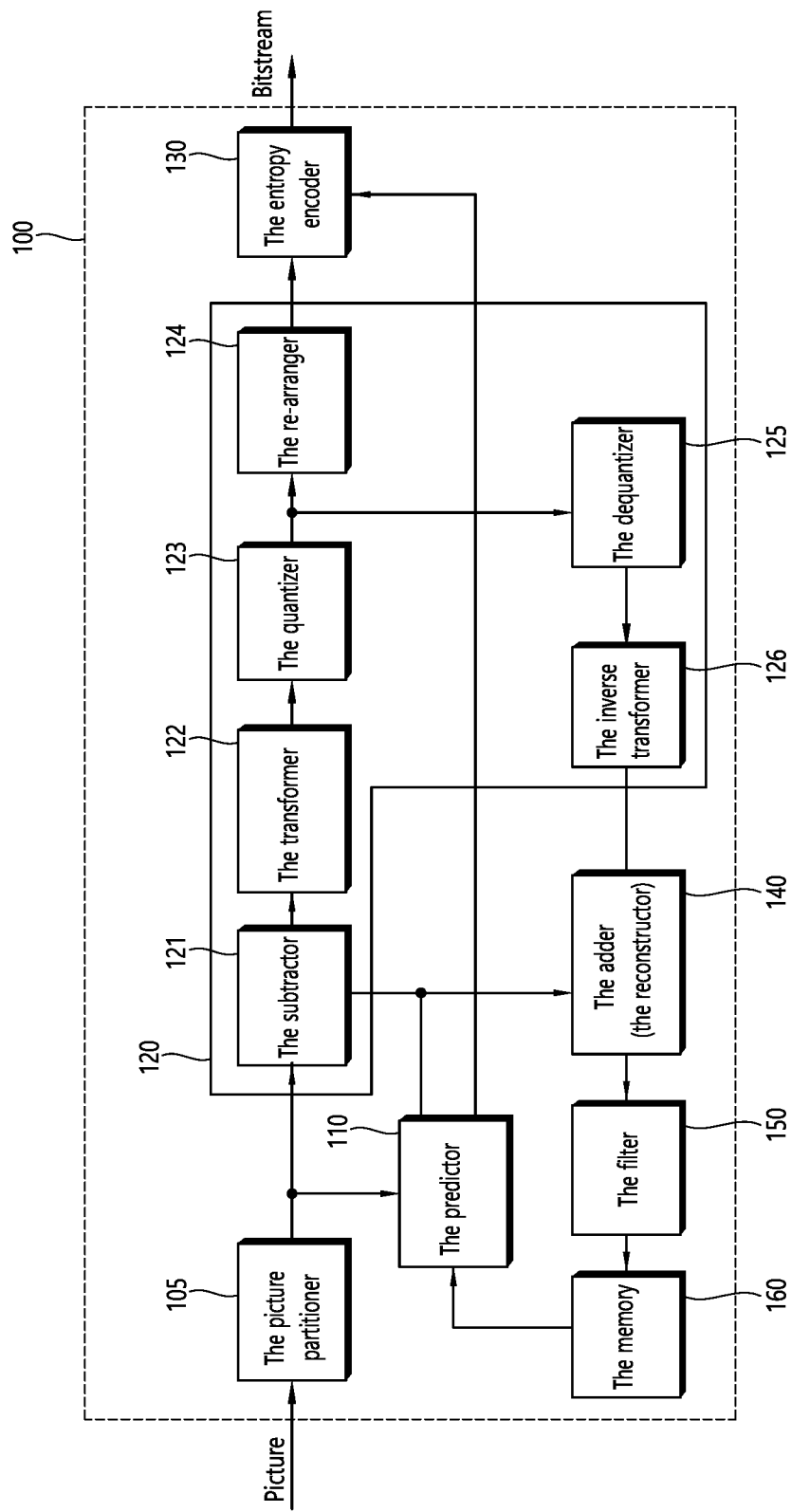
FIG. 1 is a schematic diagram illustrating a configuration of a video encoding apparatus to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Meanwhile, the present disclosure relates to video/image coding. For example, the method/embodiment disclosed in the present disclosure may be applied to a method disclosed in versatile video coding (VVC) standard or next generation video/image coding standard.

In the present disclosure, generally, a picture means a unit representing an image in a specific time slot, and a slice is a unit constructing a part of the picture in coding. A picture may include a plurality of slices, and in some cases, a picture and a slice may be used in a mixed manner.

A pixel or a pel may mean a minimum unit constructing a picture (or an image). In addition, a term 'sample' may be used corresponding to a pixel. A sample may represent a pixel or a value of pixel, generally, and may represent only a pixel/pixel value of a luma component or only a pixel/pixel value of a chroma component.

A unit represents a basic unit of image processing. A unit may include at least one of a specific area of a picture and information related to the corresponding area. A unit may be used in a mixed manner with a block or an area in some cases. In general case, M×N block may represent a set of samples including M columns and N rows or transform coefficients.

FIG. 1 is a diagram briefly illustrating a video encoding apparatus to which the present disclosure is applicable.

Referring to FIG. 1, a video encoding apparatus 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a rearranger 124, a dequantizer 125 and an inverse transformer 126.

The picture partitioner 105 may partition an input picture into at least one processing unit.

For example, a processor may be called a coding unit (CU). In this case, the coding unit may be recursively partitioned according to a quad-tree binary-tree ternary-tree (QTBT) structure from a largest coding unit (LCU). For example, one coding unit may be partitioned into a plurality of coding units of a deeper depth based on a quad tree structure and/or a binary tree structure. In this case, for example, the quad tree structure may be applied first, and the binary tree structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described below.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a colpositioned picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy encoding for quantized transform coefficients. The entropy encoding may include encoding methods such as, for example, exponential Golomb, context-adaptive variable length coding (CAVLC), context-adaptive binary arithmetic coding (CABAC), and the like. The entropy encoder 130 may encode information necessary for video reconstruction other than quantized transform coefficients (ex. values of syntax elements, etc.) together or separately. Entropy-encoded information may be transmitted or stored in units of NALs (network abstraction layer) in the form of a bitstream.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
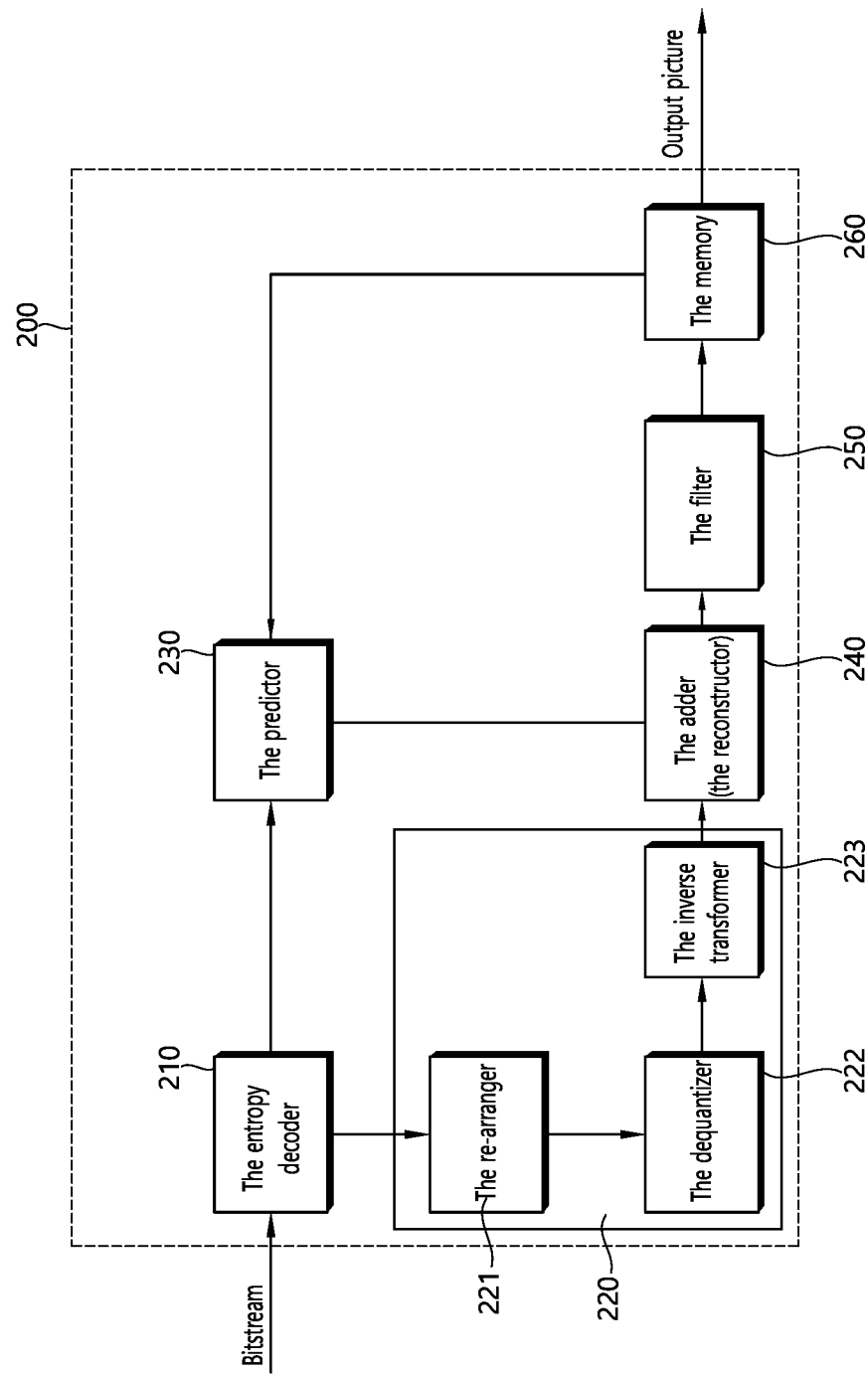
FIG. 2 is a schematic diagram illustrating a configuration of a video decoding apparatus to which the present disclosure is applicable.

FIG. 2 is a schematic diagram illustrating a configuration of a video decoding apparatus to which the present disclosure is applicable.

Referring to FIG. 2, a video decoding apparatus 200 includes an image decoder 210, a residual processor 220, a predictor 230, an adder 240, a filter 250 and a memory 260. Here, the residual processor 220 may include a rearranger 221, a dequantizer 222 and an inverse transformer 223.

When a bitstream including video information is input, the video decoding apparatus 200 may reconstruct a video corresponding to a process in which the video information is processed in the video encoding apparatus.

For example, the video decoding apparatus 200 may perform video decoding using a processor applied in the video encoding apparatus. Thus, the processor of video decoding may be a coding unit, for example, or may be a coding unit, a prediction unit or a transform unit, for another example. The coding unit may be partitioned according to a quad tree structure and/or binary tree structure from the largest coding unit.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information on prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information on a reference picture index may be acquired or derived based on the information on prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor 230 may acquire a motion vector included in the information on prediction and derive the motion vector of the current block by adding the motion vector difference to the motion vector predictor. In addition, the predictor may obtain or derive a reference picture index indicating a reference picture from the aforementioned information on prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor or reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, in performing encoding and decoding for an image as described above, the image may be partitioned into a block of a small size and encoding/decoding may be performed in a block unit. In this case, information for a size and/or a shape (e.g., square block or non-square block) of the partitioned block may be forwarded from the encoding apparatus to the decoding apparatus, and through this, the partition procedure performed in the encoding apparatus may be performed in the same way in the decoding apparatus. For example, a maximum size and a minimum size of a block in a picture may be defined in the encoding apparatus, and the information representing the maximum size of a block in a picture and the information representing the minimum size may be forwarded through a high level syntax such as VPS (Video Parameter Set), SPS (Sequence Parameter Set), PPS (Picture Parameter Set), Slice segment header or Coding unit header for transmitting additional information of the image.

In the case that the maximum block size is decided, the block of the maximum size (i.e., maximum block) may be partitioned into sub-blocks of lower depth recursively according to a partition structure. The partition structure may include QT (Quad Tree) structure, BT (Binary Tree) structure, TT (Ternary Tree) structure and/or ABT (Asymmetric binary tree) structure according to a block partitioning method. In the case that the maximum block is partitioned, a prediction and a transform may be performed in a unit of the partitioned block. For example, in the case that the maximum block size is defined as 128×128 size, and the maximum block is finally partitioned into 4 sub-blocks of 64×64 size according to the QT structure, both of the prediction unit and the transform unit for the maximum block may be defined as 64×64 size, and reconstructed in the sub-block unit.

Meanwhile, the maximum block may be represented as CTU (Coding Tree Unit) or LCU (Largest Coding Unit, LCU). Furthermore, the QT structure may represent a structure in which a block of W×H size is partitioned into 4 sub-blocks of (W/2)×(H/2) size. In addition, the BT structure may represent a structure in which a block of W×H size is partitioned into 2 sub-blocks of (W/2)×H size or 2 sub-blocks of W×(H/2) size. In addition, the TT structure may represent a structure in which a block of W×H size is partitioned into 2 sub-blocks of (W/4)×H size or 2 sub-blocks of W×(H/4) size. Furthermore, the ABT structure may represent a structure in which a block of W×H size is partitioned into a sub-block of (W/n)×H size and a sub-block of ((n−1)*W/n)×H size or a sub-block of W×(H/n) size and a sub-block of W×((n−1)H/n). Here, for example, then may be 4.

Meanwhile, as described above, a residual sample is transformed by using a transform kernel of a specific size, and a transform coefficient may be derived. In addition, in the decoding apparatus, the transform coefficient is inversely transformed by using the transform kernel of the specific size, and the residual sample may be derived. Accordingly, for the size of the transform kernel, a unit size of the transform procedure may be considered.

Accordingly, in the procedure of partitioning a block and the procedure of deciding the transform kernel, the size of the transform kernel and the size of the maximum block may be considered, and through this, the bit amount of the additional information for the current block may be reduced.

For example, the present disclosure proposes a block transform method in the case that a size of the maximum block (i.e., CTU) is greater than a size of the maximum transform kernel. Here, the maximum transform kernel may represent a transform kernel of the greatest size among the transform kernels.

As an example, in the case that the maximum block size is greater than a size of the maximum transform kernel, the decoding apparatus may determine whether to reverse-transform depending on whether a residual of the current block of the maximum block size is present. For example, in the case that a Coded block flag (Cbf) indicating whether a residual coefficient (i.e., transform coefficient) of the current block is present is 0, which may represent that a residual for the current block is not present. Accordingly, since transform coefficients to be inversely transformed are not present, even in the case that the size of the maximum transform kernel is smaller than the maximum block size, the decoding apparatus may perform a reconstruction of the current block (i.e., a prediction sample of the current block is used as a reconstructed sample directly). However, in the case that the Cbf value for the current block of the maximum block size is 1 and the maximum block size is greater than the size of the maximum transform kernel, since the transform kernel of the maximum block size is not defined, even in the case that all areas of the current block have the same prediction parameter, the block needs to be partitioned eventually. Therefore, in the present embodiment, in the case that the size of the current block is greater than the size of the maximum transform kernel, it is proposed a method for partitioning the current block according to a specially defined rule without separate partition information and performing inverse-transform in a unit of the partitioned block. That is, in the present embodiment, the current block is partitioned until the current block is available to be transformed with a size of the maximum transform kernel, while a size of block defined in a context is applied for a prediction mode, motion information, and the like, it is proposed a method for temporarily partitioning a block in accordance with a transform kernel size in an implicit method for transform/inverse transform procedure. In addition, for example, the temporarily partitioning information may be utilized for transform and deblocking filter. Furthermore, in the case that the temporal partitioning is decided, a method of arranging residual coefficients of the block may be derived in the same order as the case that the block is partitioned in the corresponding size.

Particularly, for example, a size of the cm may be 128×128 size, and a maximum size of the transform kernel may be 64×64 size. That is, the maximum block size may be 128×128 size, and a size of the maximum transform kernel may be 64×64. Here, in the case that the current block is a block which is not partitioned in the CTU, that is, in the case that a size of the current block is the maximum block size, the same prediction mode may be applied in all areas of the current block (i.e., areas of the maximum block size), alternatively, it may be represented that a prediction may be performed based on the same motion vector. However, in the case that a residual signal is present for the current block, since a transform kernel of 128×128 size is not defined, even in the case that all areas in the current block have the same prediction parameter, which means that the current block needs to be partitioned eventually.

In this case, according to the conventional method, the current block is not used in a prediction unit, but the current block needs to be partitioned. That is, the current block of 128×128 size may not be used for a coding unit, and the current block may be partitioned. However, according to the proposed embodiment, a coding unit of a size greater than a size of the maximum transform kernel may be used like the current block. That is, a coding unit may have a size greater than the maximum size of a transform kernel. The current block of the size greater than the size of the maximum transform kernel may be partitioned only in an inverse transform procedure.

Figure 3:
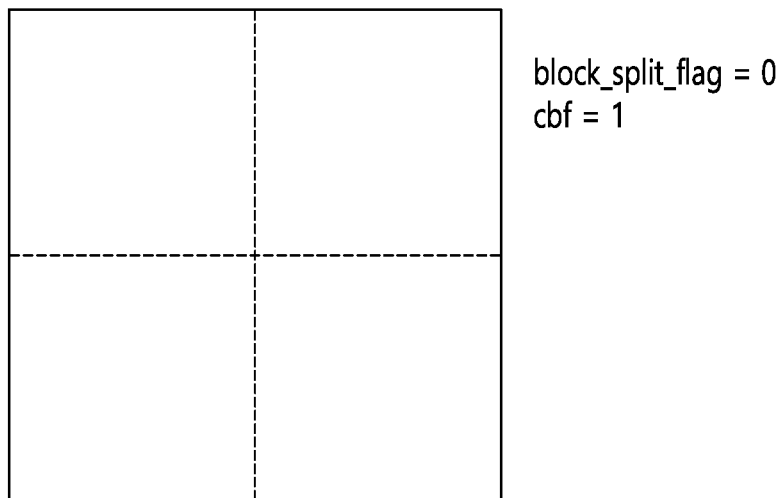
FIG. 3 illustrates an inverse transform and a deblocking filtering procedure for a current block of 128×128 size in the case that a maximum size of a transform kernel is 64×64 size.

FIG. 3 illustrates an inverse transform and a deblocking filtering procedure for a current block of 128×128 size in the case that a maximum size of a transform kernel is 64×64 size.

Referring to FIG. 3, in the case that a size of a current block is 128×128 size and cbf for the current block is 1, the current block may be partitioned into 4 blocks of 64×64 size, which is a size of the maximum transform kernel only in an inverse transform procedure. Here, the size of the maximum transform kernel may be represented as a maximum transform size. Since the partitioning procedure is a procedure promised between the encoding apparatus and the decoding apparatus, a separate syntax element of partition information for the partitioning procedure may not be signaled. That is, the partition information for the partitioning procedure may not be signaled. The inverse transform procedure for the 4 blocks is performed and residual samples may be derived, and the residual samples and the prediction samples are combined, and the current block may be reconstructed. Meanwhile, for the transform/inverse transform, the block partitioned in the current block may be represented as a transform block.

Meanwhile, the partition information for the current block transmitted from the encoding apparatus may represent a size of the block as 128×128 size, but since the current block is partitioned into a transform block for the transform/inverse transform procedure, deblocking filtering may be performed at a boundary of the transform block, and through this, discontinuity may be removed in the block boundary. As shown in FIG. 3, deblocking filtering may be performed at a boundary of the transform blocks.

Meanwhile, a CTU of 128×128 size is partitioned through the BT structure and 2 blocks of 64×128 size may be derived. In the case that the current block is a block of the 64×128 size, since a transform kernel of 128×128 size is not present, in order to perform the transform/inverse transform procedure for the current block, it may be determined whether the current block needs to be temporarily partitioned.

Figure 4:
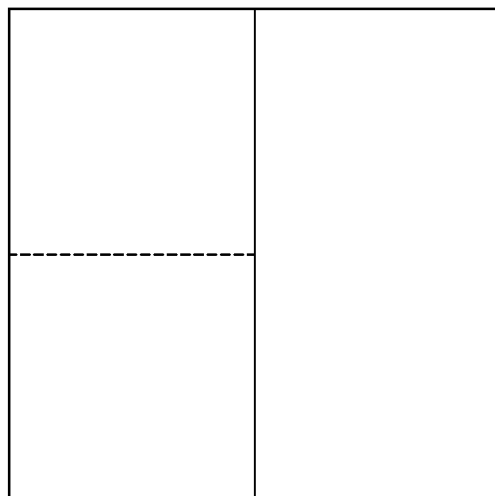
FIG. 4 illustrates an inverse transform and a deblocking filtering procedure for a current block of 64×128 size in the case that a maximum size of a transform kernel is 64×64 size.

FIG. 4 illustrates an inverse transform and a deblocking filtering procedure for a current block of 64×128 size in the case that a maximum size of a transform kernel is 64×64 size. Referring to FIG. 4, a CTU of 128×128 size is partitioned through the BT structure and 2 sub-blocks of 64×128 size may be derived. The sub-blocks may include a left sub-block and a right sub-block, and the left sub-block may be represented as block 0 and the right sub-block may be represented as block 1.

Referring to FIG. 4, in the case that a size of the block 0 is 64×128 size and cbf for the block 0 is 1, the block 0 may be partitioned into 2 blocks of 64×64 size, which is a size of the maximum transform kernel only in the inverse transform procedure. Since the partitioning procedure is a performance procedure promised between the encoding apparatus and the decoding apparatus, a separate syntax element of the partition information for the partitioning procedure may not be signaled. That is, the partition information for the partitioning procedure may not be signaled. In addition, referring to FIG. 4, in the case that a size of the block 1 is 64×128 size and cbf for the block 1 is 0, since the inverse transform procedure for the block 1 is not required to be performed, the block 0 may not be partitioned.

Meanwhile, a CTU of 128×128 size is partitioned through the TT structure, and 3 sub-blocks may be derived. For example, the sub-blocks may include a left sub-block of 32×128 size, a center sub-block of 64×128 size and a right sub-block of 32×128 size. Here, since a transform kernel of 128×128 size is not present, in order to perform the transform/inverse transform procedure for the sub-blocks, it may be determined whether the sub-blocks needs to be temporarily partitioned.

Figure 5:
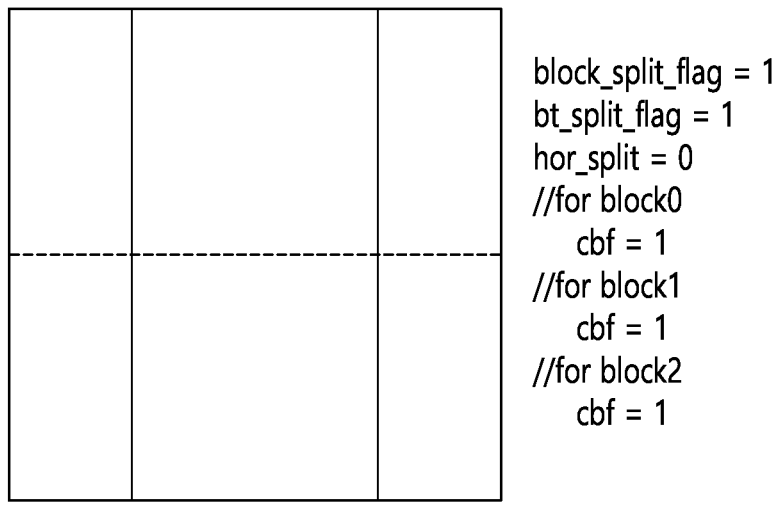
FIG. 5 illustrates an inverse transform and a deblocking filtering procedure for a sub-block partitioned through the TT structure in a CTU in the case that a maximum size of a transform kernel is 64×64 size.

FIG. 5 illustrates an inverse transform and a deblocking filtering procedure for a sub-block partitioned through the TT structure in a CTU in the case that a maximum size of a transform kernel is 64×64 size. Referring to FIG. 5, a CTU of 128×128 size is partitioned through the TT structure and 3 sub-blocks may be derived. The sub-blocks may include a left sub-block of 32×128 size, a center sub-block of 64×128 size and a right sub-block of 32×128 size, and the left sub-block may be represented as block 0, the center sub-block may be represented as block 1 and the right sub-block may be represented as block 2.

Referring to FIG. 5, in the case that a size of the block 0 is 32×128 size and cbf for the block 0 is 1, the block 0 may be partitioned into 2 blocks of 32×64 size, which is a size of the maximum transform kernel only in the inverse transform procedure. In addition, in the case that cbf for the block 1 is 1, the block 1 may be partitioned into 2 blocks of 64×64 size, which is a size of the maximum transform kernel only in the inverse transform procedure. Furthermore, referring to FIG. 5, in the case that a size of the block 2 is 32×128 size and cbf for the block 2 is 1, the block 2 may be partitioned into 2 blocks of 32×64 size, which is a size of the maximum transform kernel only in the inverse transform procedure. Since the partitioning procedure is a performance procedure promised between the encoding apparatus and the decoding apparatus, a separate syntax element of the partition information for the partitioning procedure may not be signaled. That is, the partition information for the partitioning procedure may not be signaled.

In addition, it may be proposed another example for a block transform method in the case that a maximum block (i.e., CTU) size is greater than a size of the maximum transform kernel.

For example, in the case that the maximum block size is greater than a size of the maximum transform kernel, the decoding apparatus may determine whether to reverse-transform depending on whether a residual of the current block of the maximum block size is present. For example, in the case that a Coded block flag (Cbf) indicating whether a residual coefficient (i.e., transform coefficient) of the current block is 0, which may represent that a residual for the current block is not present. Accordingly, since transform coefficients to be inversely transformed are not present, even in the case that the size of the maximum transform kernel is smaller than the maximum block size, the decoding apparatus may perform a reconstruction of the current block (i.e., a prediction sample of the current block is used as a reconstructed sample directly).

However, in the case that the Cbf value for the current block of the maximum block size is 1 and the maximum block size is greater than the size of the maximum transform kernel, since the transform kernel of the maximum block size is not defined, even in the case that all areas of the current block have the same prediction parameter, the block needs to be partitioned eventually. Therefore, in the present embodiment, in the case that the size of the current block is greater than the size of the maximum transform kernel, it is proposed a method for partitioning the current block according to a specially defined rule without separate partition information and performing inverse-transform in a unit of the partitioned block. In the embodiment described above, the current block may be partitioned until the current block is available to be transformed with a size of the maximum transform kernel, but in this embodiment, in the case that the current block is a non-square block, it is proposed a method for applying a transform kernel based on a small side of the current block. Through this, a size of block defined in a context may be applied for a prediction mode, motion information, and the like, and transform/inverse transform procedure may be performed with a block unit which is temporarily partitioned so as to be in accordance with a transform kernel size in an implicit method. That is, a prediction may be performed in a block unit derived based on the partition information and transform/inverse transform procedure and/or deblocking filtering may be performed in a block unit in which the block derived based on the partition information is partitioned and derived. Meanwhile, in the transform/inverse transform procedure for the block partitioned for the transform/inverse transform procedure, as a transform kernel of big size is applied, computation amount may be increased, and accordingly, in this embodiment, a transform kernel of a minimum size among the transform kernels which are applicable to the partitioned block may be used for the transform/inverse transform procedure. In addition, in the case that the temporal partitioning is determined, an arrangement method of a residual coefficient of the current block may be derived in the same order as the case that the current block is partitioned with the corresponding size.

Figure 6:
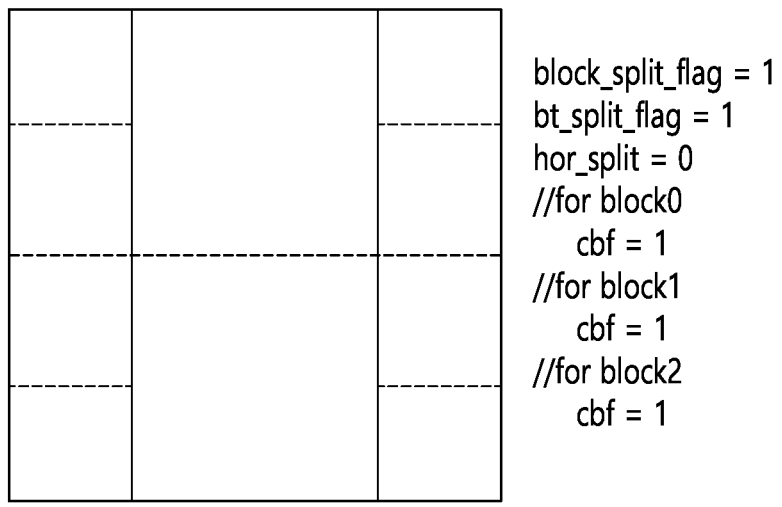
FIG. 6 illustrates an inverse transform and a deblocking filtering procedure for a CTU which is partitioned into three sub-blocks.

FIG. 6 illustrates an inverse transform and a deblocking filtering procedure for a CTU which is partitioned into three sub-blocks. Referring to FIG. 6, a size of CTU may be 128×128 size and partitioned into three sub-blocks through the TT structure. The three sub-blocks may include a left sub-block of 32×128 size, a center sub-block of 64×128 size and a right sub-block of 32×128 size. The left sub-block may be represented as block 0, the center sub-block may be represented as block 1 and the right sub-block may be represented as block 2. In addition, referring to FIG. 6, cbf for the block 0 to the block 2 may be 1, and since residual samples for the block 0 to block 2 are present, the inverse transform procedure for the block 1 is not required to be performed. Meanwhile, in the case that a size of the maximum transform kernel is 64×64, since a height is 128 for the block 0 to block 2, the inverse transform procedure may not be performed in a unit of the block 0 to block 2, and a partition for the block 0 to block 2 may be performed. In this embodiment, a partition may be performed based on a small side of a block. For example, since a small side of the block 0 is a width and the width is 32, the block 0 of 32×128 size may be partitioned into 4 transform blocks of 32×32 size. Later, the inverse transform procedure for the transform blocks may be performed, and residual samples may be derived. Furthermore, since a small side of the block 1 is a width and the width is 64, the block 1 of 64×128 size may be partitioned into 2 transform blocks of 64×64 size. Later, the inverse transform procedure for the transform blocks may be performed, and residual samples may be derived. In addition, since a small side of the block 2 is a width and the width is 32, the block 2 of 64×128 size may be partitioned into 4 transform blocks of 32×32 size. Later, the inverse transform procedure for the transform blocks may be performed, and residual samples may be derived.

Figure 7:
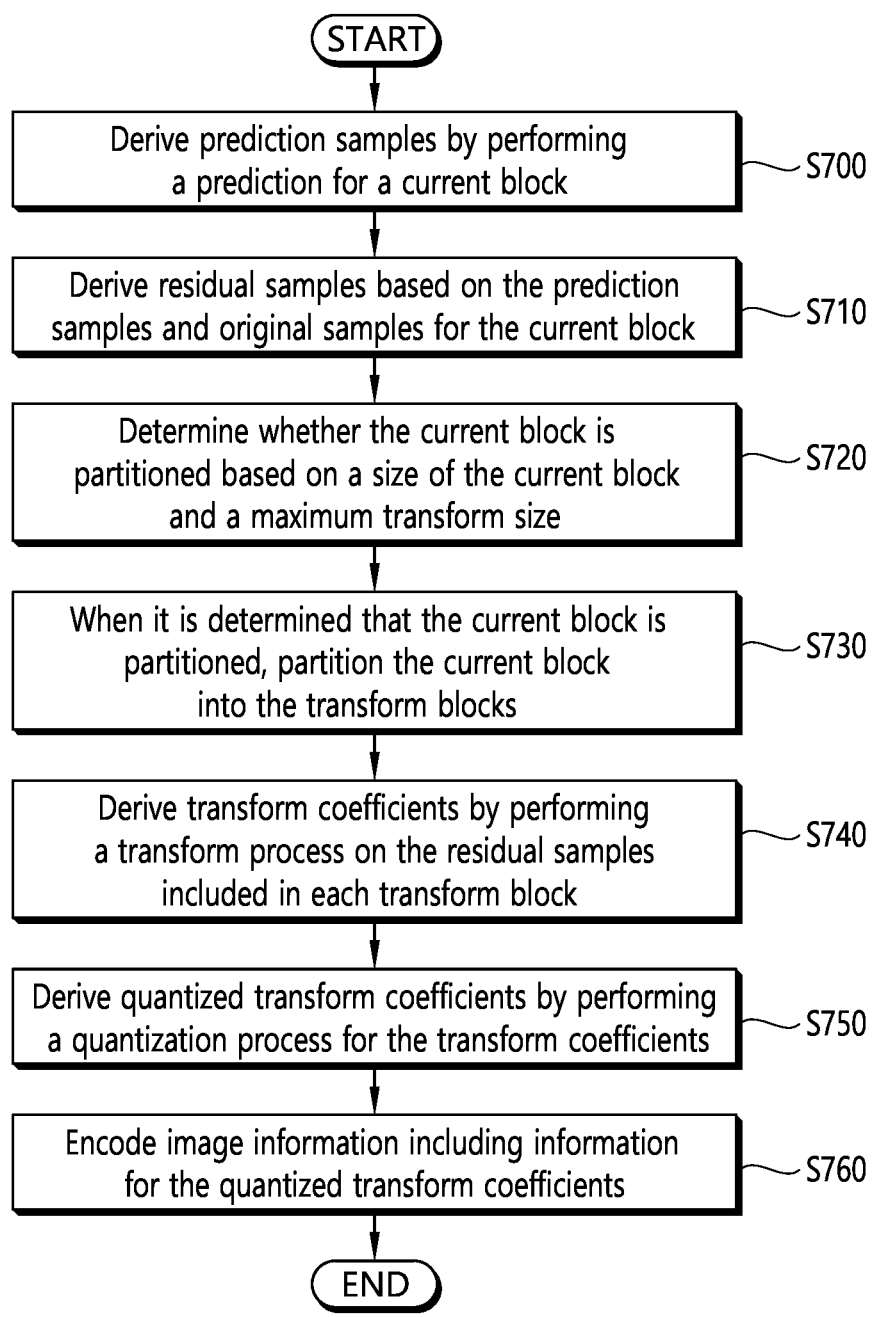
FIG. 7 schematically illustrates an image encoding method performed by the encoding apparatus according to the present disclosure.

FIG. 7 schematically illustrates an image encoding method performed by the encoding apparatus according to the present disclosure. The method shown in FIG. 7 may be performed by the encoding apparatus shown in FIG. 1. Particularly, for example, step S700 of FIG. 7 may be performed by the predictor of the encoding apparatus, step S710 may be performed by the subtractor of the encoding apparatus, steps S720 to S740 may be performed by the transformer of the encoding apparatus, step S750 may be performed by the quantizer of the encoding apparatus, and step S760 may be performed by the entropy encoder of the encoding apparatus. In addition, although it is not shown, the process of encoding information for a prediction of the current block may be performed by the entropy encoder of the encoding apparatus, and the process of performing deblocking filtering for a reconstructed sample located at areas adjacent to boundaries of transform blocks in a reconstructed picture may be performed by the filter of the encoding apparatus.

The encoding apparatus derives prediction samples by performing a prediction for a current block (step, S700). For example, the encoding apparatus may determine whether an intra prediction is applied or an inter prediction is applied to the current block and may generate a prediction sample of the sub-block by perform the intra prediction or the inter prediction to the current block.

The encoding apparatus derives residual samples based on the prediction samples and the original samples for the current block (step, S710). The encoding apparatus may generate the residual sample which is a difference between the original sample and the prediction sample. Meanwhile, the encoding apparatus may generate a reconstructed picture based on the prediction sample and the residual sample. The reconstructed picture may be used as a reference picture for a picture coded in an order after the reconstructed picture.

The encoding apparatus determines whether the current block is partitioned based on a size of the current block and the maximum transform size (step, S720). The encoding apparatus may determine whether the current block is partitioned based on a size of the current block and the maximum transform size. For example, the encoding apparatus may compare the size of the current block and the maximum transform size and determine whether the current block is partitioned into a plurality of sub-blocks. The sub-block may be a transform block as a unit of the transform procedure or the inverse transform procedure. That is, the encoding apparatus may compare the size of the current block and the maximum transform size and determine whether the current block is partitioned into sub-blocks.

As an example, in the case that the size of the current block is larger than the maximum transform size, the encoding apparatus may determine that the current block is partitioned. In addition, in the case that the size of the current block is not larger than the maximum transform size, the encoding apparatus may determine that the current block is not partitioned. Here, the case that the size of the current block is larger than the maximum transform size may represent the case that at least one of a width and a height of the current block is larger than the maximum transform size.

Meanwhile, the maximum transform size may be a size of the maximum transform kernel among transform kernels. For example, the maximum transform size may be 64×64. In this case, the maximum transform size may be represented as 64. That is, for example, the maximum transform size may be 64.

In the case that it is determined that the current block is partitioned, the encoding apparatus may partition the current block into the transform blocks (step, S730). For example, in the case that the size of the current block is larger than the maximum transform size, it may be determined that the current block is partitioned into the transform blocks.

As an example, in the case that a width of the current block is larger than the maximum transform size, the current block may be partitioned into the transform blocks having a width which is the same as the maximum transform size. In addition, in the case that a height of the current block is larger than the maximum transform size, the current block may be partitioned into the transform blocks having a height which is the same as the maximum transform size. Furthermore, in the case that a width and a height of the current block is larger than the maximum transform size, the current block may be partitioned into the transform blocks having a width and a height which is the same as the maximum transform size.

For example, in the case that a width of the current block is W and the width of the current block is larger than the maximum transform size, a width of the transform blocks may be derived as W/2. In addition, for example, in the case that a height of the current block is H and the height of the current block is larger than the maximum transform size, a height of the transform blocks may be derived as H/2.

In addition, for example, in the case that a size of the current block is W×H and a width of the current block is larger than the maximum transform size and a height of the current block is not larger than the maximum transform size, the current block may be partitioned into transform blocks of (W/2)×H size.

Furthermore, for example, in the case that a size of the current block is W×H and a width of the current block is not larger than the maximum transform size and a height of the current block is larger than the maximum transform size, the current block may be partitioned into transform blocks of W×(H/2) size.

In addition, for example, in the case that a size of the current block is W×H and a width of the current block is larger than the maximum transform size and a height of the current block is larger than the maximum transform size, the current block may be partitioned into transform blocks of (W/2)×(H/2) size.

Furthermore, for example, in the case that the current block is a non-square block, a width of the current block is larger than the maximum transform size and a height of the current block is larger than the maximum transform size, the current block may be partitioned into transform blocks of a width of the same length of the height of the current block. In addition, for example, in the case that the current block is a non-square block, a height of the current block is larger than a width of the current block and a height of the current block is larger than the maximum transform size, the current block may be partitioned into transform blocks of a height of the same length of the width of the current block.

For example, in the case that the current block is a non-square block, a size of the current block is W×H, a width of the current block is larger than the maximum transform size, and a height of the current block is not larger than the maximum transform size, the current block may be partitioned into transform blocks of H×H size.

In the case that the current block is a non-square block, a size of the current block is W×H, a width of the current block is not larger than the maximum transform size, and a height of the current block is larger than the maximum transform size, the current block may be partitioned into transform blocks of W×W size.

Meanwhile, in the case that a size of the current block is not larger than the maximum transform size, the current block may not be partitioned, and the current block which is not partitioned may be derived as a transform block. Here, the case that the size of the current block is not larger than the maximum transform size may represent the case that a width and a height of the current block is not larger than the maximum transform size.

The encoding apparatus derives transform coefficients by performing a transform process for the residual samples included in each of the transform blocks (step, S740). The encoding apparatus may derive the transform coefficients by transforming the residual samples. The transform process may be performed in a transform block unit. For example, the encoding apparatus may generate a transform coefficient by transforming a residual sample in a transform block unit. That is, the encoding apparatus may derive transform coefficients by performing transform procedure for the residual samples included in each of the transform blocks. For example, the encoding apparatus may generate a transform coefficient by transforming a residual sample in a transform block unit. Here, the transform kernel for the transform block may be derived as a transform kernel of the smallest size among the transform kernels of which sizes are greater than the transform block.

Meanwhile, a residual sample for the transform block may not be present, and in this case, a transform coefficient for the transform block may not be derived.

The encoding apparatus derives quantized transform coefficients by performing quantization process for the transform coefficients (step, S750). The encoding apparatus may generate a quantized transform coefficient by quantizing the transform coefficients.

The encoding apparatus encodes image information including information for the quantized transform coefficients (step, S760). The encoding apparatus may encode image information including information for the quantized transform coefficients and output it through a bitstream. In addition, the bitstream may be stored in a non-transitory computer readable medium. The information for the quantized transform coefficients may be represented as residual information. Furthermore, the image information may include information for a prediction of the current block.

Meanwhile, the bitstream may be transmitted to the decoding apparatus through a network or a (digital) storage medium. Here, the network may include a broadcasting network and/or a communication network, and the digital storage medium may include various storage medium such as USB, SD, CD, DVD, Blu-ray, HDD, SSD, and the like.

Figure 8:
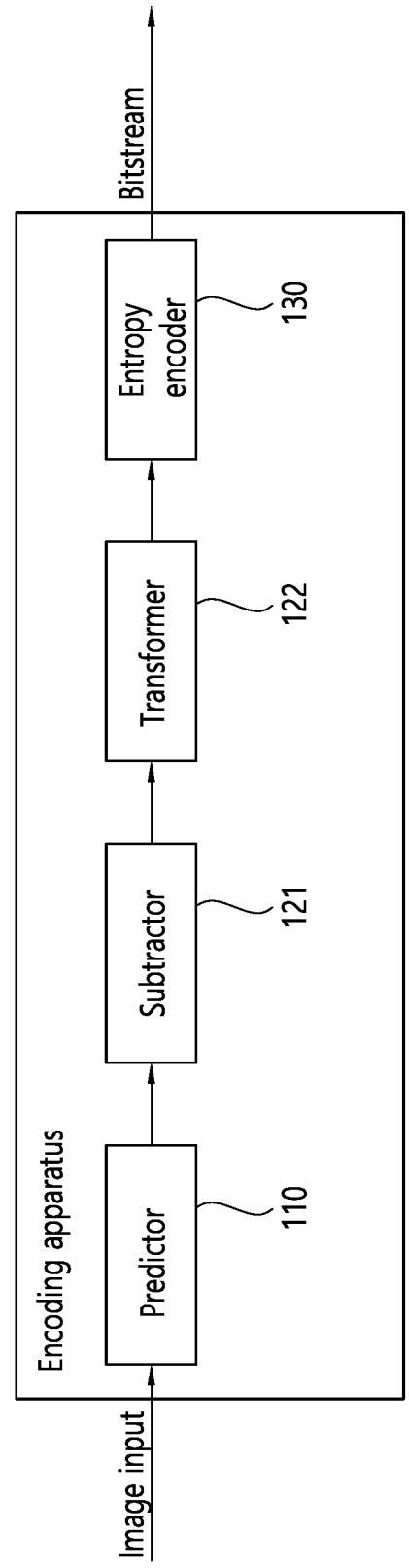
FIG. 8 schematically illustrates an encoding apparatus for performing an image method according to the present disclosure.

FIG. 8 schematically illustrates an encoding apparatus for performing an image method according to the present disclosure. The method shown in FIG. 7 may be performed by the encoding apparatus shown in FIG. 8. Particularly, for example, step S700 of FIG. 7 may be performed by the predictor of the encoding apparatus, step S710 may be performed by the subtractor of the encoding apparatus, steps S720 to S740 may be performed by the transformer of the encoding apparatus, step S750 may be performed by the quantizer of the encoding apparatus, and step S760 may be performed by the entropy encoder of the encoding apparatus. In addition, although it is not shown, step S750 of FIG. 7 may be performed by the quantizer of the encoding apparatus. Furthermore, the process of encoding information for a prediction of the current block may be performed by the entropy encoder of the encoding apparatus of FIG. 8, and the process of performing deblocking filtering for a reconstructed sample located at areas adjacent to boundaries of transform blocks in a reconstructed picture may be performed by the filter of the encoding apparatus of FIG. 8.

Figure 9:
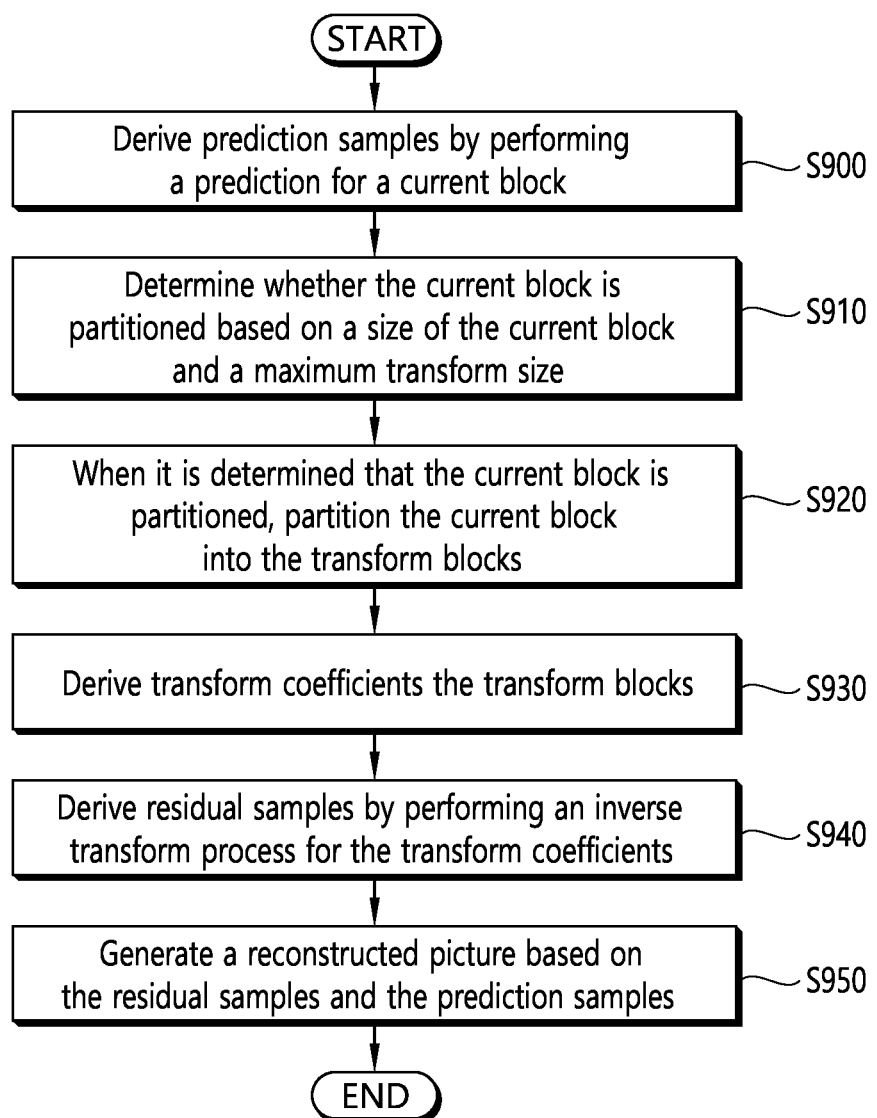
FIG. 9 schematically illustrates the image decoding method of the decoding apparatus according to the present disclosure.

FIG. 9 schematically illustrates the image decoding method of the decoding apparatus according to the present disclosure. The method shown in FIG. 2 may be performed by the decoding apparatus shown in FIG. 2. Particularly, for example, step S900 of FIG. 9 may be performed by the predictor of the decoding apparatus, steps S910 to S940 of FIG. 9 may be performed by the inverse transformer of the decoding apparatus, and step S950 of FIG. 9 may be performed by the adder of the decoding apparatus. In addition, although it is not shown, the process of obtaining the information for a prediction of the current block through a bitstream and/or the information for a residual of the transform block may be performed by the entropy decoder of the decoding apparatus, the process of deriving transform coefficients by performing dequantization for the quantized transform coefficients may be performed by the dequantizer of the decoding apparatus, and the process of performing deblocking filtering for the reconstructed sample located at an area adjacent to a boundary of the transform blocks in the reconstructed picture may be performed by the filter of the decoding apparatus.

The decoding apparatus derives prediction samples by performing a prediction for a current block (step, S900). For example, the decoding apparatus may generate a prediction sample of the sub-block by perform the intra prediction or the inter prediction to the current block. The decoding apparatus may obtain information for the prediction for a current block through a bitstream and may derive the prediction samples by performing a prediction for the current block based on the information for the prediction.

Meanwhile, the current block may be included in a current CTU and may be a block derived based on the partition information for the current CTU. For example, the decoding apparatus may obtain the partition information through the bitstream and may derive the current block in the current CTU based on the partition information. The partition information may include a partition flag, QT (Quad-Tree) flag, MTT (Multi-Type Tree) flag, BT (Binary-Tree) flag and/or partition direction information.

Here, the partition flag may represent whether the current CTU is partitioned.

In addition, the QT flag may represent whether the corresponding block is partitioned through the QT (Quad-Tree) structure. The QT structure may represent a structure in which a block of W×H size is partitioned into 4 sub-blocks of (W/2)×(H/2) size.

Furthermore, the MTT flag may represent whether the corresponding block is partitioned through a partition structure except the QT structure. The partition structure except the QT structure may include BT (Binary-Tree) structure, TT (Ternary-Tree) structure and/or ABT (Asymmetric Binary Tree) structure. The BT structure may represent a structure in which a block of W×H size is partitioned into 2 sub-blocks of (W/2)×H size or 2 sub-blocks of W×(H/2) size. In addition, the TT structure may represent a structure in which a block of W×H size is partitioned into 2 sub-blocks of (W/4)×H size or 2 sub-blocks of W×(H/4) size. Furthermore, the ABT structure may represent a structure in which a block of W×H size is partitioned into a sub-block of (W/n)×H size and a sub-block of ((n−1)*W/n)×H size or a sub-block of W×(H/n) size and a sub-block of W×((n−1)H/n). Here, for example, then may be 4.

The partition direction information may represent a direction in which the corresponding block is partitioned. For example, the partition direction information may indicate a vertical direction or a horizontal direction. In the case that the block is partitioned in the vertical direction through the BT structure, the block of W×H size may be partitioned into 2 sub-blocks of (W/2)×H size, and in the case that the block is partitioned in the horizontal direction through the BT structure, the block of W×H size may be partitioned into 2 sub-blocks of W×(H/2) size. In addition, in the case that the block is partitioned in the vertical direction through the TT structure, the block of W×H size may be partitioned into a left sub-block of (W/4)×H size, a center sub-block of (W/2)×H size and a right sub-block of (W/4)×H size, and in the case that the block is partitioned in the horizontal direction through the TT structure, the block of W×H size may be partitioned into an upper sub block of W×(H/4) size, a center sub-block of W×(H/2) size and a lower sub-block of W×(H/4) size. Furthermore, in the case that the block is partitioned in the vertical direction through the ABT structure, the block of W×H size may be partitioned into a sub-block of (W/n)×H and a sub-block of ((n−1)*W/n)×H size, and in the case that the block is partitioned in the horizontal direction through the ABT structure, the block of W×H size may be partitioned into a sub-block of W×(H/n) size and a sub-block of W×((n−1)H/n) size. Here, for example, the n may be 4.

In the case that the current CTU is not partitioned, that is, in the case that the partition flag represents that the current CTU is not partitioned, the current block may be a block including an area of the current CTU. Alternatively, in the case that the current CTU is partitioned based on the partition information, the current block may be a square block which is partitioned through the QT structure. Alternatively, the current block may be a non-square block which is partitioned through the BT structure, the TT structure and/or the ABT structure. Meanwhile, for example, a size of the current block may be 128×128.

The decoding apparatus determines whether the current block is partitioned based on a size of the current block and a maximum transform size (step, S910). The decoding apparatus may determine whether the current block is partitioned based on a size of the current block and the maximum transform size. For example, the decoding apparatus may compare the size of the current block and the maximum transform size and determine whether the current block is partitioned into a plurality of sub-blocks. The sub-block may be a transform block as a unit of the transform procedure or the inverse transform procedure. That is, the decoding apparatus may compare the size of the current block and the maximum transform size and determine whether the current block is partitioned into sub-blocks.

As an example, in the case that the size of the current block is larger than the maximum transform size, the decoding apparatus may determine that the current block is partitioned. In addition, in the case that the size of the current block is not larger than the maximum transform size, the decoding apparatus may determine that the current block is not partitioned. Here, the case that the size of the current block is larger than the maximum transform size may represent the case that at least one of a width and a height of the current block is larger than the maximum transform size.

Meanwhile, the maximum transform size may be a size of the maximum transform kernel among transform kernels. For example, the maximum transform size may be 64×64. In this case, the maximum transform size may be represented as 64. That is, for example, the maximum transform size may be 64.

In the case that it is determined that the current block is partitioned, the decoding apparatus may partition the current block into the transform blocks (step, S920). In the case that the size of the current block is larger than the maximum transform size, it may be determined that the current block is partitioned.

As an example, in the case that a width of the current block is larger than the maximum transform size, the current block may be partitioned into the transform blocks having a width which is the same as the maximum transform size. In addition, in the case that a height of the current block is larger than the maximum transform size, the current block may be partitioned into the transform blocks having a height which is the same as the maximum transform size. Furthermore, in the case that a width and a height of the current block is larger than the maximum transform size, the current block may be partitioned into the transform blocks having a width and a height which is the same as the maximum transform size.

For example, in the case that a width of the current block is W and the width of the current block is larger than the maximum transform size, a width of the transform blocks may be derived as W/2. In addition, for example, in the case that a height of the current block is H and the height of the current block is larger than the maximum transform size, a height of the transform blocks may be derived as H/2.

In addition, for example, in the case that a size of the current block is W×H and a width of the current block is larger than the maximum transform size and a height of the current block is not larger than the maximum transform size, the current block may be partitioned into transform blocks of (W/2)×H size.

Furthermore, for example, in the case that a size of the current block is W×H and a width of the current block is not larger than the maximum transform size and a height of the current block is larger than the maximum transform size, the current block may be partitioned into transform blocks of W×(H/2) size.

In addition, for example, in the case that a size of the current block is W×H and a width of the current block is larger than the maximum transform size and a height of the current block is larger than the maximum transform size, the current block may be partitioned into transform blocks of (W/2)×(H/2) size.

Furthermore, for example, in the case that the current block is a non-square block, a width of the current block is larger than the maximum transform size and a height of the current block is larger than the maximum transform size, the current block may be partitioned into transform blocks of a width of the same length of the height of the current block. In addition, for example, in the case that the current block is a non-square block, a height of the current block is larger than a width of the current block and a height of the current block is larger than the maximum transform size, the current block may be partitioned into transform blocks of a height of the same length of the width of the current block.

For example, in the case that the current block is a non-square block, a size of the current block is W×H, a width of the current block is larger than the maximum transform size, and a height of the current block is not larger than the maximum transform size, the current block may be partitioned into transform blocks of H×H size.

In the case that the current block is a non-square block, a size of the current block is W×H, a width of the current block is not larger than the maximum transform size, and a height of the current block is larger than the maximum transform size, the current block may be partitioned into transform blocks of W×W size.

Meanwhile, in the case that a size of the current block is not larger than the maximum transform size, the current block may not be partitioned, and the current block which is not partitioned may be derived as a transform block. Here, the case that the size of the current block is not larger than the maximum transform size may represent the case that a width and a height of the current block is not larger than the maximum transform size.

The decoding apparatus derives transform coefficients the transform blocks (step, S930). The decoding apparatus may obtain residual information for each of the transform blocks and may derive the transform coefficients the transform blocks based on the residual information. Particularly, the decoding apparatus may obtain residual information for each of the transform blocks, may derive quantized transform coefficients by entropy-decoding the residual information, and may derive a transform coefficient for each transform block by performing dequantization process for the quantized transform coefficients.

For example, the decoding apparatus may parse a flag representing whether a transform coefficient for a transform block is present, and in the case that the flag value is 1, the decoding apparatus may obtain residual information for the transform block through a bitstream, and may derive a transform coefficient for the transform block based on the residual information. The flag may represent coded block flag (cbf) described above. Meanwhile, in the case that the flag value is 0, a transform coefficient for the transform block may not be derived, and a residual sample for the transform block may not be present.

The decoding apparatus derives residual samples by performing an inverse transform process for the transform coefficients (step, S940). The decoding apparatus may derive the residual samples by inversely transforming the transform coefficients. The inverse transform process may be performed in a transform block unit. For example, the decoding apparatus may derive a residual sample by inversely transforming the transform coefficient for the transform block by using the transform kernel for the transform block. Here, the transform kernel for the transform block may be derived as a transform kernel of the smallest size among the transform kernels of which sizes are greater than the transform block.

The decoding apparatus generates a reconstructed picture based on the residual samples and the prediction samples (step, S950). The decoding apparatus may generate reconstructed samples based on the residual samples and the prediction samples and may generate a reconstructed block or a reconstructed picture based on it. For example, the decoding apparatus may generate a reconstructed sample by adding a prediction sample and a corresponding residual sample to the prediction sample. The residual sample corresponding to the prediction sample may represent a residual sample for the same position of the prediction sample. Meanwhile, in the case that a residual sample for a transform block is not present, the prediction sample may be directly used as a reconstructed sample.

Later, as occasion demands, in order to improve subjective/objective image quality, the decoding apparatus may apply the in-loop filtering process such as deblocking filtering and/or SAO process to the reconstructed picture as described above. For example, the decoding apparatus may perform deblocking filtering for the reconstructed sample located at an adjacent area to boundaries of the transform blocks in the reconstructed picture.

Figure 10:
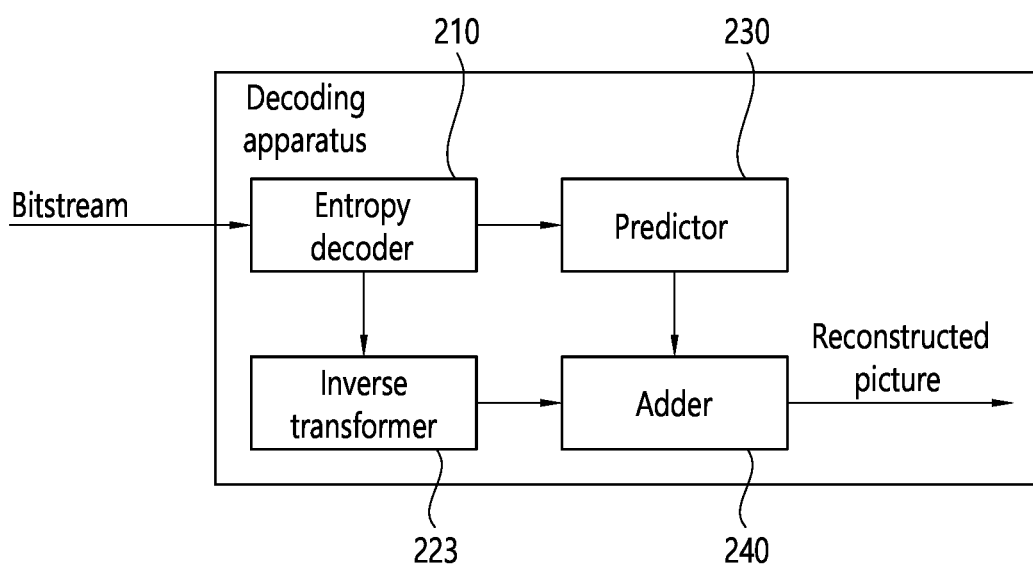
FIG. 10 schematically illustrates the decoding apparatus performing the image decoding method according to the present disclosure.

FIG. 10 schematically illustrates the decoding apparatus performing the image decoding method according to the present disclosure. The method shown in FIG. 9 may be performed by the decoding apparatus shown in FIG. 10. Particularly, for example, the predictor of the decoding apparatus shown in FIG. 10 may perform step S900 of FIG. 9, the inverse transformer of the decoding apparatus shown in FIG. 10 may performs steps S910 to S940 of FIG. 9, and the adder of the decoding apparatus of FIG. 10 may perform step S950 of FIG. 9. In addition, although it is not shown, the process of obtaining the information for a prediction of the current block through a bitstream and/or the information for a residual of the transform block may be performed by the entropy decoder of the decoding apparatus, the process of deriving transform coefficients by performing dequantization for the quantized transform coefficients may be performed by the dequantizer of the decoding apparatus, and the process of performing deblocking filtering for the reconstructed sample located at an area adjacent to a boundary of the transform blocks in the reconstructed picture may be performed by the filter of the decoding apparatus.

According to the present disclosure described above, in the case that at least one side of a current block is greater than a maximum transform size, without any separate partitioning information, the partitioning of the current block may be partitioned into a transform block of a size of which partitioning becomes minimized, and through this, a bit number for partitioning information may be reduced, and computation complexity in a decoding apparatus may be reduced, and accordingly, overall coding rate may be improved.

In addition, according to the present disclosure, in the case that at least one side of a current block is greater than a maximum transform size, without any separate partitioning information, the partitioning of the current block may be partitioned into a transform block of a size of which partitioning becomes minimized, and deblocking filtering may be performed at a boundary of the partitioned transform block, and through this, a bit number for partitioning information may be reduced, and accordingly, subjective/objective image quality of an image may be improved.

In the above-described embodiment, the methods are described based on the flowchart having a series of steps or blocks, but the present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present disclosure described above may be implemented in software form, and the encoding apparatus and/or the decoding apparatus according to the present disclosure may be included in an apparatus that performs image processing such as a TV, a computer, a smartphone, a set-top box, a display device, and the like.

When the embodiments of the present disclosure is implemented with software, the method described above may be implemented with a module (process, function, etc.) that performs the function described above. The module may be stored in a memory and executed by a processor. The memory may be disposed to the processor internally or externally and connected to the processor using a variety of well-known means. The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. That is, the embodiments described in the present disclosure may be performed by being implemented on a processor, a micro-processor, a controller or a chip. For example, the functional units shown in each drawing may be implemented and performed on a computer, a processor, a micro-processor, a controller or a chip.

In addition, the decoding apparatus and the encoding apparatus to which the embodiments of the present disclosure are applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus and a medical video apparatus and may be used to process video signals and data signals. For example, the OTT video apparatus may include a game console, a blue-ray player, an internet access TV, a home theater system, a smartphone, a tablet PC, a Digital Video Recorder (DVR), and the like.

Further, the processing method to which the present disclosure is applied may be produced in the form of a computer-executed program, and may be stored in a computer-readable recording medium. The multimedia data having the data structure according to the present disclosure can also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-Data storage devices. In addition, the computer-readable recording medium includes media implemented in the form of a carrier wave (for example, transmission over the Internet). In addition, the bit stream generated by the encoding method can be stored in a computer-readable recording medium or transmitted over a wired or wireless communication network.

Further, a content streaming system to which the present disclosure is applied may include an encoding server, a streaming server, a web server, a media storage, a user device, and a multimedia input device.

The encoding server compresses content input from multimedia input devices such as smartphones, cameras, camcorders, etc. Into digital data to generate a bitstream and transmit the bitstream to the streaming server. As another example, when multimedia input devices such as smartphones, cameras, camcorders, etc. directly generate a bitstream, the encoding server may be omitted. The bitstream may be generated by an encoding method or a bitstream generating method to which the present disclosure is applied, and the streaming server may temporarily store the bitstream in the process of transmitting or receiving the bitstream.

The streaming server transmits multimedia data to the user device based on a user request through the web server, and the web server serves as an intermediary for informing the user of what services are provided. When a user requests a desired service from the web server, the web server delivers it to a streaming server, and the streaming server transmits multimedia data to the user. Here, the content streaming system may include a separate control server, and in this case, the control server controls a command/response between devices in the content streaming system.

The streaming server may receive content from a media repository and/or an encoding server. For example, when content is received from the encoding server, the content may be received in real time. In this case, in order to provide a smooth streaming service, the streaming server may store the bitstream for a predetermined time.

Examples of the user device include a mobile phone, a smartphone, a laptop computer, a digital broadcasting terminal, a personal digital assistant (PDA), a portable multimedia player (PMP), a navigation device, and a slate PC, a tablet PC, ultrabook, a wearable device (e.g., smartwatch, glass glasses, head mounted display), a digital TV, a desktop computer, a digital signage, and so on. Each server in the content streaming system may operate as a distributed server, and in this case, data received from each server may be processed in a distributed manner.

What is claimed is:

1. A method of decoding video performed by a decoding device, the method comprising:
   obtaining residual information and a flag for whether transform coefficients for a current block are present from a bitstream;
   deriving prediction samples by performing a prediction for the current block;
   determining whether a value of the flag is 1 which indicates the transform coefficients for the current block are present;
   based on the value of the flag being 1, determining whether the current block is partitioned based on a width and a height of the current block and a maximum transform size;
   deriving transform blocks by partitioning the current block based on a result of the determination;
   deriving the transform coefficients for the derived transform blocks based on the residual information;

deriving residual samples by performing an inverse transform process for the transform coefficients; and generating a reconstructed picture based on the residual samples and the prediction samples, wherein based on the value of the flag being 1, it is determined that the current block is partitioned into the transform blocks based on at least one of a case in which the width of the current block is greater than a width of the maximum transform size and a case the height of the current block is greater than a height of the maximum transform size.

2. The method of claim 1, wherein the width of the current block is W and the height of the current block is H, wherein based on the width of the current block being greater than the width of the maximum transform size, a width of the transform blocks is derived as W/2, and wherein based on the height of the current block being greater than the height of the maximum transform size, a height of the transform blocks is derived as H/2.

3. The method of claim 1, wherein based on the width of the current block being greater than the width of the maximum transform size and the height of the current block being not greater than the height of the maximum transform size, the current block is partitioned into the transform blocks of (W/2)×H size.

4. The method of claim 1, wherein based on the width of the current block being not greater than the width of the maximum transform size and the height of the current block being greater than the height of the maximum transform size, the current block is partitioned into the transform blocks of W×(H/2) size.

5. The method of claim 1, wherein based on the width of the current block being greater than the width of the maximum transform size and the height of the current block being greater than the height of the maximum transform size, the current block is partitioned into the transform blocks of (W/2)×(H/2) size.

6. The method of claim 1, wherein based on the width of the current block being greater than the width of maximum transform size and the height of the current block being not greater than the height of the maximum transform size, the current block is partitioned into the transform blocks of H×H size.

7. The method of claim 1, wherein based on the current block being a non-square block, the width of the current block being not larger than the width of the maximum transform size and the height of the current block being larger than the height of the maximum transform size, the current block is partitioned into the transform blocks of W×W size.

8. The method of claim 1, wherein the maximum transform size is a size of a maximum transform kernel among transform kernels.

9. The method of claim 1, further comprising performing deblocking filtering for a reconstructed sample located in an adjacent area to boundaries of the transform blocks in the reconstructed picture.

10. A method of encoding video performed by an encoding device, the method comprising:

deriving prediction samples by performing a prediction for a current block;

deriving residual samples based on original samples and the prediction samples for the current block;

generating a flag for whether transform coefficients for the current block are present;

based on a value of the flag being 1 which indicates the transform coefficients for the current block are present, determining whether the current block is partitioned based on a width and a height of the current block and a maximum transform size;

deriving transform blocks by partitioning the current block based on a result of the determination;

deriving the transform coefficients by performing a transform process on residual samples included in the derived transform blocks;

deriving quantized transform coefficients by performing a quantization process on the transform coefficients; and encoding video information comprising the flag and residual information for the quantized transform coefficients, wherein based on the value of the flag being 1, it is determined that the current block is partitioned into the transform blocks based on at least one of a case in which the width of the current block is greater than a width of the maximum transform size and a case the height of the current block is greater than a height of the maximum transform size.

11. The method of claim 10, wherein the width of the current block is W and the height of the current block is H, wherein based on the width of the current block being greater than the width of the maximum transform size, a width of the transform blocks is derived as W/2, and wherein based on the height of the current block being greater than the height of the maximum transform size, a height of the transform blocks is derived as H/2.

12. A non-transitory computer-readable storage medium storing a bitstream including the video information encoded by the method of claim 10.

13. A transmission method of data for image, the method comprising:

obtaining a bitstream of video information comprising a flag for whether transform coefficients for a current block are present and residual information for the transform coefficients; and transmitting the data including the bitstream of the video information comprising the flag and the residual information for the transform coefficients, wherein based on a value of the flag being 1 which indicates the transform coefficients for the current block are present, whether the current block is partitioned into one or more transform blocks is determined based on a width and a height of the current block and a maximum transform size, and wherein based on the value of the flag being 1, it is determined that the current block is partitioned into the transform blocks based on at least one of a case in which the width of the current block is greater than a width of the maximum transform size and a case the height of the current block is greater than a height of the maximum transform size.

* * * * *